Patented May 19, 1953

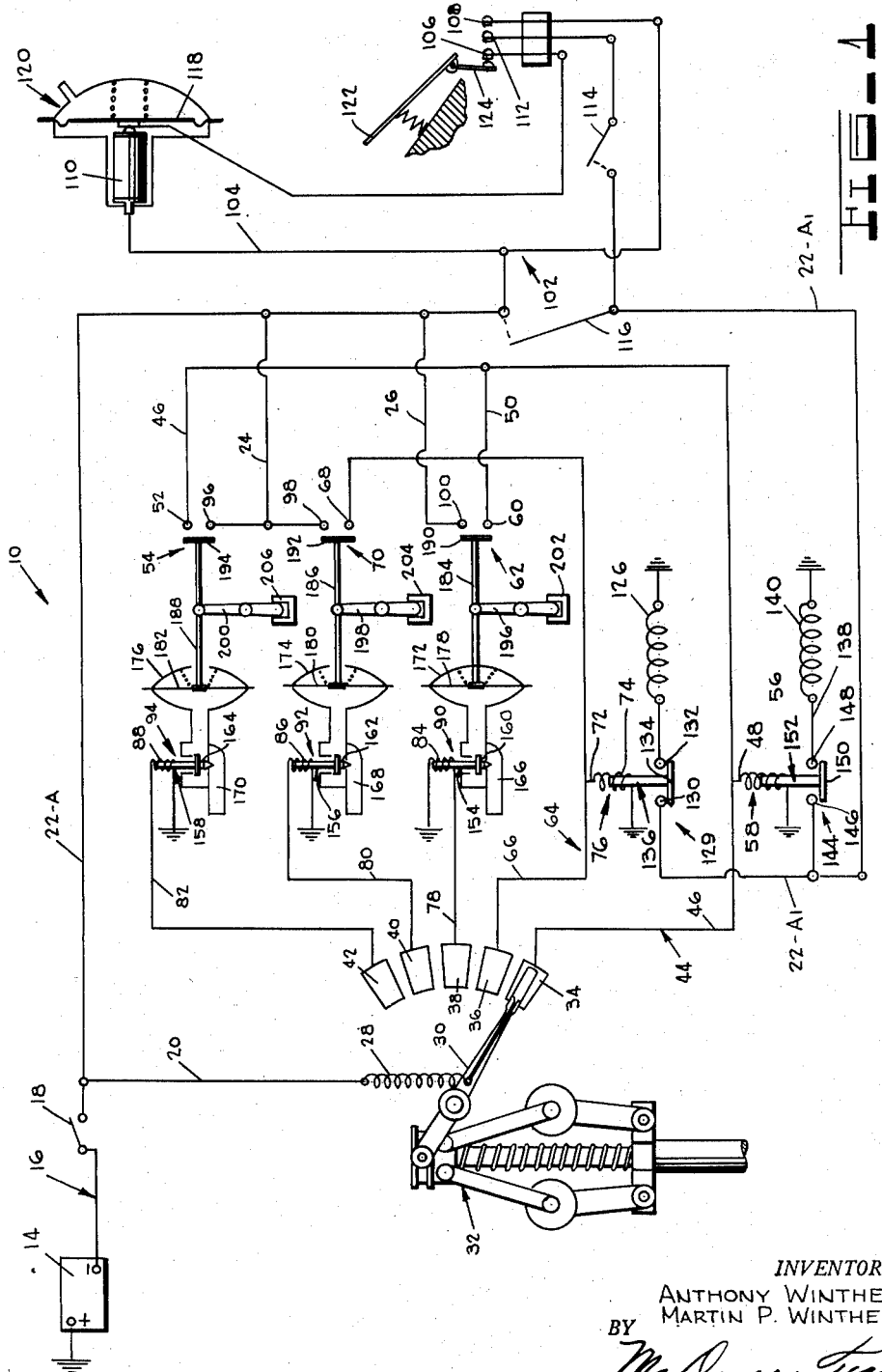

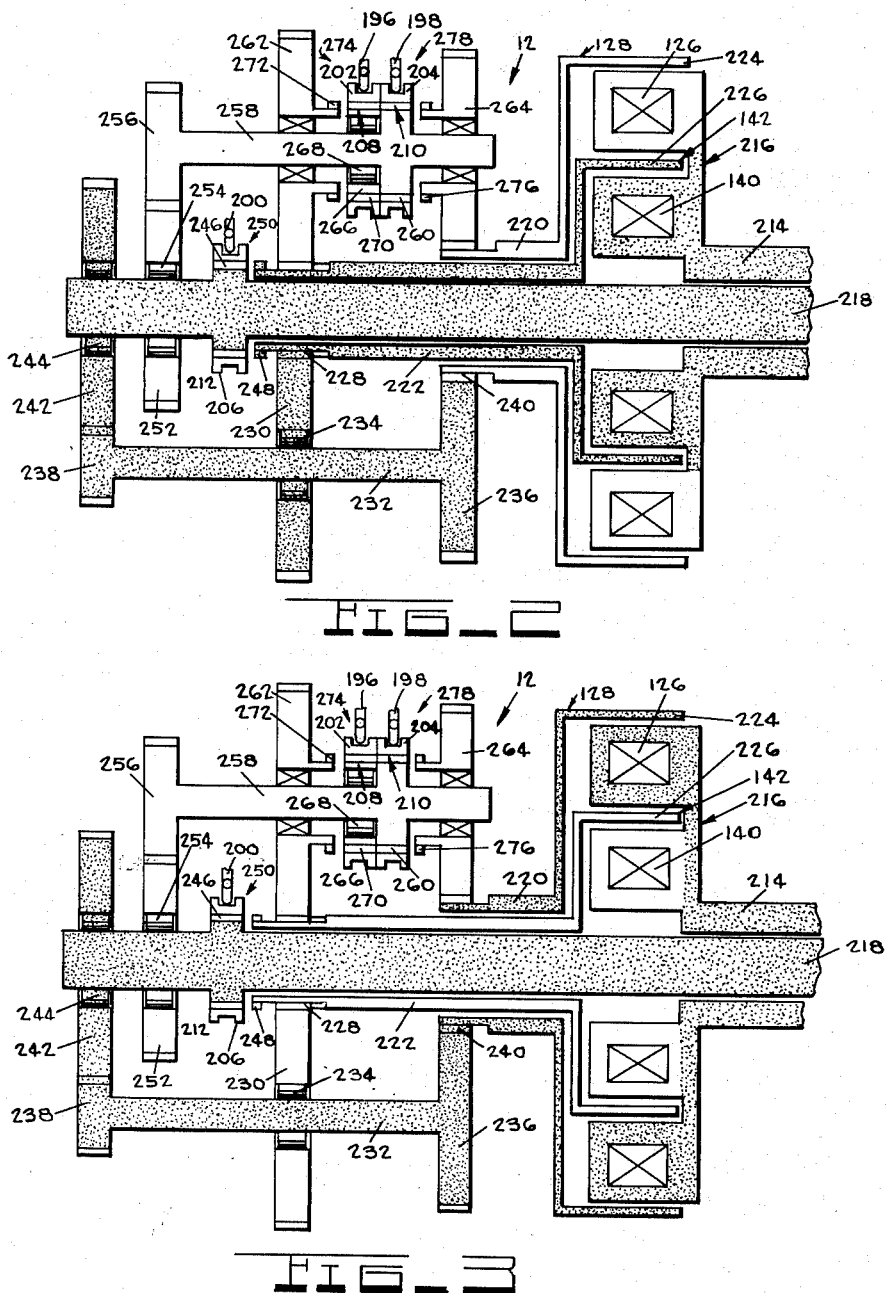

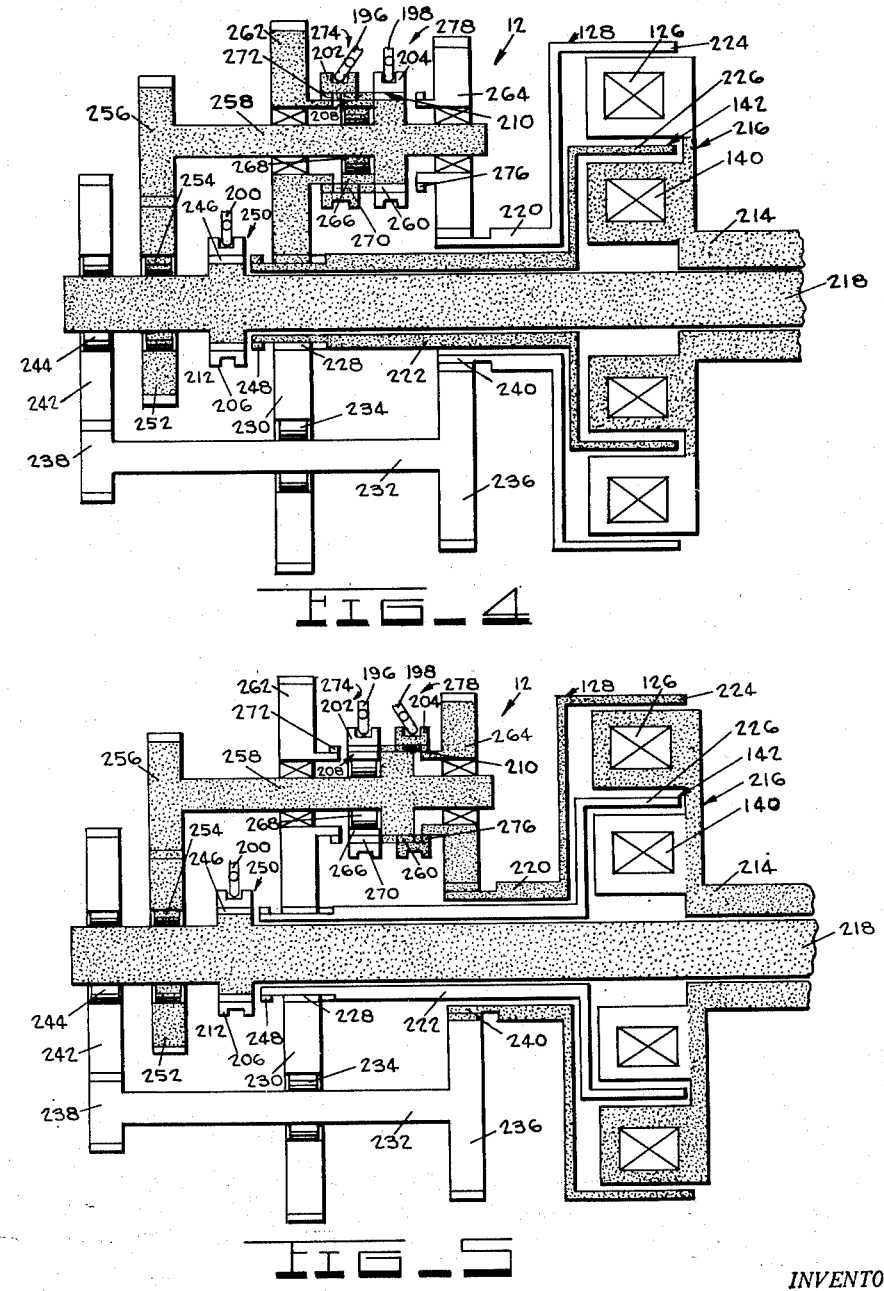

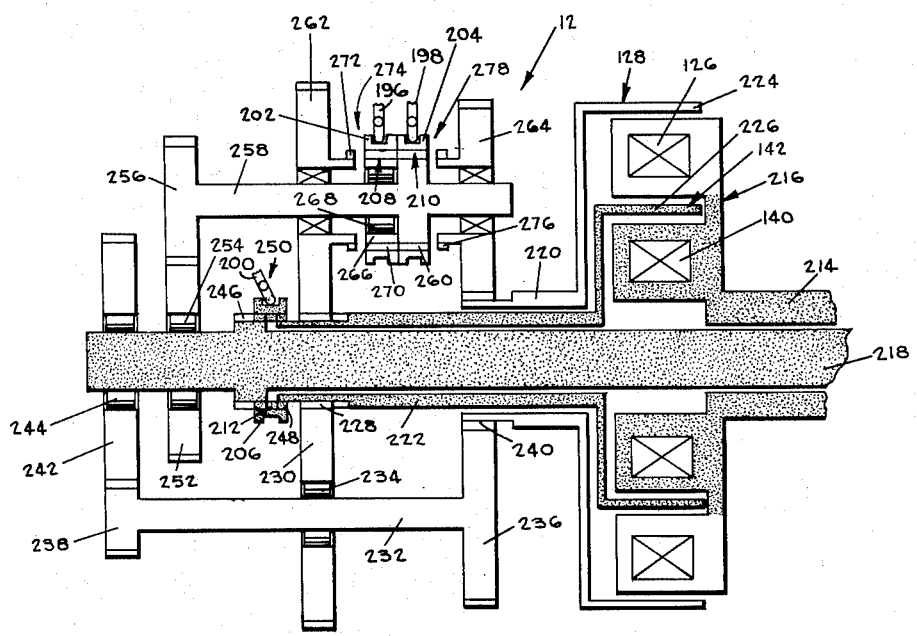
FIG_6

2,638,793

UNITED STATES PATENT OFFICE 2,638,793

TRANSMISSION CONTROL SYSTEM

Anthony Winther, Kenosha, Wis., and Martin P. Winther, Gates Mills, Ohio, assignors, by mesne assignments, to Eaton Manufacturing Company, Cleveland, Ohio, a corporation of Ohio Application March 29, 1951, Serial No. 218,106

16 Claims. (Cl. 74—472)

This invention relates to transmissions and more particularly to a control system therefor and constitutes a continuation-in-part of application Ser. No. 206,643 filed January 18, 1951, and application Ser. No. 86,201 filed April 8, 1949, now Patent No. 2,549,738.

Broadly the invention comprehends the provision of a governor controlled transmission control system for step-by-step type transmissions including therein an accelerator control for starting gear operation.

Among the objects of the invention are to provide a control system for step-by-step type transmissions that is simple and effective in operation; that is adaptable to vehicles for the automatic controlled gear speed operation thereof; that is electrical power supplied; that operates to effect a gear speed change corresponding to vehicle speeds; that utilizes a governor operable to cause a gear shift through the full speed range of vehicle forward operation; that provides for controlled acceleration of the vehicle, to which applied, when the vehicle is in starting gear; that provides for a five speed forward control of operation in smooth ladder staging steps one to another; and that provides for overlap in control of gear change effecting a smooth changeover from one gear speed to another gear speed in either upstaging or downstaging of transmission operation.

Other objects and advantages of the invention will appear from the following description taken in connection with the drawings forming a part of the specification; and in which:

Fig. 1 is a schematic layout of a control system for ladder type transmission; and Figs. 2 through 6 are schematic layouts of a step-by-step type gear transmission in succeeding stages of forward speed operation as controlled by the system of Fig. 1.

Similar reference characters indicate corresponding parts throughout the several views of the drawings.

This control system was devised primarily for use in the effective automatic control of the transmission disclosed by co-pending application Ser. No. 86,201 whereby a smooth staging of operation is attained from first through fifth forward gear speed under the control of a speed governor driven from the propeller or like output shaft of an engine driven vehicle or the like. In addition to the normal staging of gear speed change, a modulated acceleration control for starting gear speed is provided. The control system comprises basically an electrical power supplied system utilizing a propeller shaft driven governor as the gear staging control center whereby a specific combination of a multiple of different ratio gear sets and a pair of electromagnetic clutches can be synchronized for the proper effective and smooth operation of the transmission. The gear sets are adapted upon electrical control thereof to be actuated by any suitable power source such as air pressure, vacuum or electric depending upon which is most appropriate.

The acceleration control includes a variable resistance mechanism adapted to be connected into a control circuit under the control of switches actuated by the accelerator pedal permitting of the operation of the variable resistance mechanism under the influence of engine vacuum for a modulated operational control of the starting gear clutch upon initial depression of the accelerator pedal and whereby upon full depression of the pedal the variable resistance mechanism is by-passed. This acceleration control is preferably restricted to the starting gear although it might also be applied to the second gear stage.

Referring to the drawings for more specific details of the invention 10 represents generally a control system Fig. 1 for a step-by-step type transmission 12, Figs. 2 through 6.

The control system 10 is supplied current from an electrical source of power such as a battery 14 and includes a circuit 16 controlled as by a vehicle engine ignition switch 18.

The circuit 16 includes a pair of major current conductors 20 and 22, and branch conductors 24 and 26.

Conductor 20 is adapted to supply current by way of pigtail 28, fastened to a lever 30 of a propeller shaft driven governor 32, to a series of spaced substantially arcuately arranged current conducting switch segments or contacts 34, 36, 38, 40 and 42.

Switch contact 34 is connected in a circuit 44 including major and branch conductors 46, 48 and 50 respectively connected to contact terminal 52 of switch 54, coil 56 of a solenoid 58, and contact terminal 60 of switch 62.

Switch contact 36 is connected in a circuit 64 including conductor 66 terminating in a contact terminal 68 of a switch 70 and a branch conductor 72 connected to a coil 74 of a solenoid 76.

Switch contacts 38, 40 and 42 are connected respectively by way of conductors 78, 80 and 82 to the coils 84, 86 and 88 of solenoids 90, 92 and 94.

Conductor 24 terminates in spaced contact terminals 96 and 98 forming a part of the respective switches 54 and 70 and conductor 26 terminates in contact terminal 100 forming a part of switch 62.

An accelerator control circuit 102 interposed in conductor 22 includes a conductor 104 connected to one section A of conductor 22 terminating at opposite ends in contact terminals 106 and 108 respectively with a carbon pile variable resistor 110 connected in the conductor 22 intermediate the terminals thereof. Another section A, of conductor 22 set apart from the section connected to conductor 104 terminates in a contact terminal 112 arranged in spaced relation intermediate contact terminals 106, 108.

A switch 114, is interposed in section A, of conductor 22 and is adapted to control the operation of accelerator control circuit 102 whereby, through appropriate connection with the shifting mechanism for the transmission 12 to which control system 10 is applied, the switch is not engaged until the transmission is out of neutral. A switch 116 is arranged intermediate the sections A and A, of conductor 22 operably connected to the transmission shift mechanism for an actuation thereof to close conductor 22 and effect a direct flow of current therethrough bypassing circuit 102 when the transmission has been shifted out of first or starting gear operation.

If it is desired switch 114 can be dispensed with wherein provision is had so that no connection is made between the power plant and transmission 12 driven thereby until a movement of the vehicle is desired as controlled by governor 32.

The carbon pile resistor 110 is controlled by the operation of a vacuum actuated diaphragm 118 forming part of a vacuum cylinder 120 having conduit connection with the manifold of an engine with which transmission 12 is to be associated.

An accelerator pedal 122 has a part 124 thereof adapted to effect controlled contacting engagement of the contact terminals 106, 112 and 108 with an initial contact being affected between contact terminal 106 and 112 and thence between 106 and 112 and 112 and 108 for current flow therethrough.

The opposite end of section A of conductor 22, has a coil 126 of an electromagnetic clutch 128 forming a material element of transmission 12, controlled as by a switch 129. The switch 129 includes a pair of spaced contact terminals 130 and 132 in section A, of conductor 22 adapted to be bridged by a switch element 134 forming part of an armature 136 of solenoid 74.

A branch conductor 138 is connected to section A, of conductor 22, intermediate connection of coil 126 and switch 129 thereof and connection with circuit 102. The conductor 138 similarly to section A, conductor 22 terminates in coil 140 (such as coil 126) of a second electromagnetic clutch 142 forming another essential element of transmission 12, controlled as by a switch 144. The switch 144 includes a pair of spaced contact terminals 146 and 148 in conductor 138 adapted to be bridged by a switch element 150 forming part of an armature of solenoid 152.

The solenoids 90, 92 and 94 include in addition to their respective coils 84, 86 and 88, armatures 154, 156 and 158 each terminating respectively in valve elements 160, 162 and 164. The valve elements are arranged in valve housings 166, 168 and 170 therefor for controlling the flow of air pressure, from a source not shown, to the pressure chambers of respective air cylinders 172, 174 and 176. The valve elements 160, 162, and 164 in addition to controlling the flow of air from the air pressure source to the cylinders also control the release of air pressure from the cylinders to the atmosphere.

The air cylinders 172, 174, 176 have respective resiliently loaded diaphragms 178, 180 and 182 therein opposing the air pressure delivered to the cylinder and operative to be moved to exhaust the air from the cylinders when the valve elements connect the pressure chamber of the cylinders to the atmosphere.

Shiftable rods 184, 186 and 188 are connected at one end to the respective diaphragms 178, 180 and 182 and terminate at their opposite ends in switch elements 190, 192, 194 forming a part of the respective switches 62, 70 and 54.

Pivotal levers 196, 198 and 200 have their one free end freely connected to the respective rods 184, 186 and 188 and their other ends associated with collars 202, 204 and 206 of internal splines 208, 210 and 212 for the shifting thereof as actuated by movement of the respective levers 196, 198 and 200.

Transmission 12 of the step-by-step type adapted to be controlled by electrical control system includes a power input shaft 214 directly coupled to input member 216 supporting clutch coils 126 and 140 therein, a power output shaft 218, and intermediate quill shafts 220 and 222 telescoping one another and output shaft 218, supporting respectively at one end thereof drums 224 and 226 of the respective clutches 126 and 148.

Quill shaft 222 as provided near its free end with a pinion gear 228, having meshing engagement with a gear 230, said gear 230 having driving connection with a countershaft 232 through an overrunning clutch 234.

Countershaft 232 supports at opposite ends thereon gears 236 and 238, gear 236 having meshing engagement with a pinion gear 240 provided at the free end of shaft 220 whereas gear 238 meshes with a gear 242 connected by way of overrunning clutch 244 to one end of shaft 218.

The shaft 218 is splined at 246 and by way of splines 212 of shiftable collar 206, forms, with splines or teeth 248, on the extremity of shaft 222, a crown or dental coupling 250. The splines 212 of the collar 206 are adapted to interdigitate with the splines 248 on the shaft 222 upon shifting thereof to directly couple shafts 218 and 222 together for rotation in unison.

A gear 252 connected to shaft 218 through overrunning clutch 254 meshes with a gear 256 provided upon one end of a second countershaft 258. The counter-shaft 258 has intermediate its length splines or teeth 260 engageable with the splines of collar 204 axially shiftable thereon.

Gears 262 and 264 are journalled on the shaft 258 on opposite axially disposed sides of splines 260 and mesh respectively with pinion gears 228 and 240 of the shafts 222 and 220.

An annular member 266 lying adjacent the splined portion of shaft 258 and connected to shaft 258 by way of an overrunning clutch 268, is provided with external splines or teeth 270 having meshing engagement with splines 208 of shiftable collar 202.

The collar 202 is axially shiftable on splines 270 and together with external splines or teeth 272 on the hub of gear 262 with which it is adapted to have engagement provides a crown or dental coupling 274, whereas the collar 204 axially shiftable on splines 260 is engageable with external splines or teeth 276 on the hub of gear 264 to form therewith a crown or dental coupling 278.

Reference is had to co-pending application Ser. No. 86,201 for a more detailed description and explanation of operation of transmission 12.

In a normal operation of transmission 10 and control system 12 therefor with the ignition switch 18, of a power plant for propelling a vehicle of which the transmission 10 forms a part, closed and the engine operating at idle speed the system 12 will be at virtual rest with all of the elements thereof besides switch 18 in open position, as shown by Fig. 1.

With the transmission placed in condition for transmitting power therethrough such that switch 114 is moved to closed position in conductor 22–A, and the governor is driven at an ample speed, from say output shaft 218 of the transmission, to actuate lever 30 thereof to have contact with switch contact 34, an initial depression of accelerator pedal 122 by way of part 124 thereof causes engagement between terminal contacts 106 and 112 providing for a flow of current by way of conductor 22–A, conductor 104 through variable resistor 110, conductor 22–A, and branch conductor 138, for supply thereof to coil 140 through closed switch 144. The flow of current to coil 140 through switch 144 is possible since it is the flow of current from battery 14 by way of conductor 20, pigtail 28, lever 30, switch contact 34, conductor 46, and branch conductor 48 to coil 56, operation upon the energization thereof to actuate armature 152 and close switch 144.

The flow of current to coil 140 of clutch 142 is modulated through the variable resistor 110 controlled as by the vacuum of the power plant acting upon diaphragm 118 against the spring resistance thereof. By so modulating the flow of current as controlled by engine vacuum a very smooth operation of clutch 142 for starting gear operation of the vehicle is provided.

Fig. 2 illustrates schematically the flow of power through the transmission for starting gear wherein the power as transmitted from input shaft 214 by way of clutch 142 flows through quill shaft 222 connected to drum 226 of the clutch by way of gear 228 thereof to gear 230; from gear 230 to countershaft 232 through overrunning clutch connection therewith, thence through countershaft 232 by way of meshing gears 238 and 242 and overrunning clutch 244 connection of gear 242 with output shaft 218 for the output transmission of power therefrom to the vehicle's wheels.

As the speed of the vehicle is further increased resulting in a movement of the lever 30 thereof as occasioned by the speed of the vehicle delivered to governor 32 thereof, the lever 30 passes from switch contact 34 to switch contact 36 setting circuit 66 connected thereto into operation. Simultaneously with the speed switch change of the governor the switch 116 may be actuated to closed position to bridge conductors 22–A and 22–A, for the purpose of by-passing modulation control of clutch 128 through the elimination of acceleration control circuit 102 at this time.

Upon changeover of the governor control from switch contact 34 to switch contact 36 a slight overlap is provided so that a smooth takeover in gear ratio speed change can be effected. With the circuit 64 supplied current, it flows through conductor 66 and branch conductor 72 resulting in energizing coil 74 of solenoid 76 thus effecting movement of armature 136 thereof and switch element forming a part of said armature to close switch 128 between contact terminals 130 and 132 permitting of the flow of current thereacross. Simultaneously with current flow in circuit 66, current is permitted to flow through conductor 22–A, across switch 116 to conductor 22–A, and thence by way of closed switch 128 to coil 126 of clutch 128 for the energization thereof.

Fig. 3 illustrates the condition of 2nd gear operation wherein with the clutch 142 de-energized and clutch 128 energized, power flows from input shaft 214, through clutch 128 by way of its drum 224 to quill shaft 220, thence to countershaft 232 by way of meshing engagement between gears 240 and 236, from countershaft 232 by way of meshing engagement between gears 238 and 242, and by way of overrunning clutch 244 connected between gear 242 and output shaft 218 for delivery therefrom.

Third speed gear operation is illustrated in Fig. 4, said operation being attained as governor lever 30 moves from switch contact 36 to switch contact 38, thereby delivery current to conductor 78, resulting in supplying current to coil 84 for the operation of solenoid 90. Movement of armature 154 of the solenoid is effected by its energization causing valve 160 forming a part thereof to be moved in valve housing 166 therefor resulting in the delivery of air under pressure from a suitable source, not shown, through the valve housing for delivery to air pressure cylinder 172. As a result of the air under pressure being delivered to the cylinder, the diaphragm 178 thereof is actuated to move a shift rod 184 connected thereto in a direction to pivot lever 196, and also to move switch element 190 thereof to switch closed position. Whereas the pivoting of lever 196 results in the actuation of collar 202 of dental clutch 274 to provide coupling engagement between annular member 266 and hub of gear 262 wherein the splines 208 of collar 22 engage the splines 270 and 272, of the respective annular member 266 and gear 262, the closing of switch 62 results in current flow across contact terminals 60 and 100 thereof for delivery from the source thereof for energization of coil 56 of solenoid 58. With the actuation of armature 152 and switch element 150 connected thereto to close switch 144 and with the normally existent flow of current in conductor 22, the coil 140 of clutch 142 is supplied current resulting in the energization thereof.

With the clutch 142 energized and a gear shift provided in the transmission, power will flow from shaft 214 through clutch 142, thence by way of meshing engagement of gears 228 and 262 and dental coupling of the hub of gear 262 to annular member through overrunning clutch 268 to countershaft 258; countershaft 258 by way of gear 256 transmitting power to gear 252 which in turn transmits it through overrunning clutch 254 connection with output shaft thereto for delivery therefrom.

A further increase in speed of the vehicle will move the lever arm 30 of the governor to pass from switch contact 38 to switch contact 40 whereupon current is delivered therethrough to conductor 80 resulting in the energization of coil 86 of solenoid 92. With the solenoid energized armature 156 and valve element 162 forming a part of the armature are moved whereby the valve element 162 in housing 168 operates to permit of the flow of air pressure through the housing from a source, not shown, to air pressure cylinder 174. Air pressure delivered to cylinder 174 results in overcoming the spring load imposed on the diaphragm 180 thereof such that the diaphrgam actuates shift rod 186 connected thereto to pivot lever 198 connected thereto and move switch element 192 to close switch 70 of which it forms a part.

The movement of lever 198 results in the shifting of collar 204 of dental coupling 278 to couple the shaft 258 to the hub of gear 264 wherein the splines 210 of collar 204 engage with both splines 260 of shaft 258 and splines 276 on the hub of gear 264. Simultaneously with the movement of the collar 204 for a gear ratio change of the transmission the clutch 128 is energized as a result of the closing of switch 70 and the delivery of current from the source of power across terminals 98 and 68 of switch 70 to solenoid 76 for the actuation of armature 136 and switch element 134 to close the current flow circuit of conductor 22 to the coil 126 of clutch 128.

It is to be understood that as the governor lever 30 moves to complete current conducting relation with a different switch contact in either the staging up or down of transmission gear speed change, that the preceding stage of control returns to normal whereby the operational control thereof no longer exists aside from the overlapping provided in passing from one stage to the next. As a consequence in the case of lever 30 moving off switch contact 38 in passing to switch contact 40 provides for the elements controlled thereby to return to normal whereby the collar 202 is again shifted to uncouple annular member 266 from the gear 262.

Upon the energization of clutch 128 and shifting of collar 204 to couple shaft 258 to gear 264 a fourth speed of operation of the transmission is attained wherein as shown by Fig. 5 power flows from input shaft 214 through clutch 128 and by way of drum 224 thereof to shaft 220, thence by way of meshing engagement between gears 240 and 264, and coupling of gear 264 and shaft 258 to gear 256 connected to shaft 258, gear 256 in turn through meshing engagement with gear 252 coupled through overrunning clutch 254 to shaft 218 for the output delivery therefrom.

With the movement of lever 30 of governor 32, as induced by higher speed of the vehicle, to bridge the switch contacts 40 and 42 and then pass completely to switch contact 40 a fifth gear speed ratio of operation of the transmission is attained.

Through engagement of lever 30 with contact switch 42 current flows therethrough to conductor 82 for the subsequent energization of coil 88 of solenoid 94 resulting in the actuation of armature 158 and valve element 164 connected thereto. Valve element 164 is operatively movable in valve housing 170 effective to permit of the flow of air pressure from a source, not shown, to air pressure cylinder 176. As the air under pressure is delivered to cylinder 176 it operates to actuate diaphragm 182 against the resistance of the spring load imposed thereon, whereupon the diaphragm moves shift rod connected therewith. Shift rod 188 in its movement actuates pivoted lever 200 connected thereto and moves switch element 194 forming a part thereof engagement across contact terminals 52 and 96 to close switch 54. With switch 54 closed current is supplied thereacross and by way of conduit 46 to energize coil 56 of armature 58 effective upon the actuation of armature 152 of the solenoid to move switch element 150 to close the circuit for supplying current to coil 140 of clutch 142 by way of conductor 22.

With clutch 142 energized and lever 200 pivoted to provide for engagement of dental coupling 250 wherein collar 206 is axially shifted to couple shafts 222 and 218 together for rotation in unison direct speed ratio is accomplished whereby the speed of shaft 214 aside from operating slip between the input member and drum 226 of clutch 142 is transmitted to the output shaft 218 by way of coupling relation between shafts 222 and 218.

Simultaneously with the transmission operating completely in fifth gear, the fourth gear speed ratio is dispensed with as the lever 30 moves off of engagement with switch contact 40.

This completes an upstaging of transmission speeds from first or starting gear through fifth gear as controlled primarily by the action of governor 32 establishing the desired flow of current in circuit 16 as the output speed of the vehicle dictates. A downstaging of gear speed ratios will follow exactly in reverse the upstaging herein defined and it is not felt necessary to described same in view thereof.

The part of lever 30 engaging switch contacts 34, 36, 38, 40 and 42 is purposely made of a particular size so as to permit of a bridging of adjacent contacts in a downstaging as well as an upstaging of the transmission so as to provide for the selection of a higher gear when increasing speed and a lower gear with vehicle decreasing speed. As such when the vehicle reaches the normal running speed which provides the maximum horsepower at any given road speed, the lever will not bridge the space between the contacts and the gear previously used before the change is made, is then dropped.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. A control system for a prime mover driven transmission having a driven shaft, a plurality of power operated gear change mechanisms, a plurality of controlled elements including a pair of electromagnetic clutches, and a governor under the influence of the speed of the driven shaft; comprising an electrical power supplied network, an electrical circuit for controlling the operation of one of the clutches connected in the network including a set of normally open contacts, an electrical circuit for controlling the operation of the other clutch connected in the network including a set of normally open contacts, electrically operated switch means one for connecting the contacts of each clutch circuit, a plurality of electrical control circuits, one for each mechanism, means adapted to be actuated by governor for connecting the circuits for the mechanisms with the network and for connecting the switch means with the network and mans actuated by the mechanisms for connecting the switch means with the network.

2. A control system according to claim 1 wherein an ignition switch is provided in the network.

3. A control system according to claim 2 wherein the switch means are each arranged in separate circuits, said switch means having normally open contacts and being connected to the network at one end thereacross and at its other end with the network through the means associated with the governor.

4. A control system according to claim 2 wherein an acceleration control circuit is interposed in the circuit for one of the clutches, said circuit including a variable resistance controlled as by vacuum produced in the prime mover and normally open contacts adapted to be actuated by an accelerator for the prime mover to cause the current flow in the circuit to pass through the resistance upon initial depression of the accelerator and upon full depression of the accelerator to by-pass the resistance.

5. A control system according to claim 4 wherein the acceleration control circuit is interposed in the circuit for both clutches.

6. A control system according to claim 5 wherein switch means in the circuits for the clutches by-pass the acceleration control circuit.

7. A control system according to claim 2 wherein the governor includes a pivoted lever arm having current conducting means thereon connected in the network.

8. A control system according to claim 7 wherein the current conducting means are engageable with current conducting elements of the circuits for the mechanisms and the switches.

9. A control system according to claim 8 wherein the conducting elements are arranged in substantially arcuate spaced relation to one another.

10. A control system according to claim 3 wherein each mechanism includes a shiftable rod having a switch element as a part thereof engageable to close the contacts of the circuit of one of the switch means and adapted to have a gear speed change shift lever actuated thereby.

11. A control system according to claim 10 wherein the control circuit for the mechanism includes a solenoid actuated valve, said valve being movable in a valve housing for controlling the supply of air pressure for movement of the shifting rod of the mechanism.

12. A control system according to claim 8 wherein the current conducting means of the governor can bridge adjacent current conducting elements.

13. A control system according to claim 2 wherein there are three mechanisms and correspondingly three circuits and three current conducting elements therefor.

14. A control system according to claim 13 wherein the current conducting elements of the switch means and mechanisms provide in connection with the governor lever arm current conducting means five different gear speed controls for the transmission.

15. A control system according to claim 13 wherein the switch means for one clutch circuit is connected to the network by the means of two mechanisms and the switch means for the other clutch circuit is connected to the network by the means of the other mechanism.

16. A control system according to claim 15 wherein the one clutch circuit connected to the circuit by means of two of the mechanisms provides for operation of the clutch of said circuit in first, third and fifth gear speeds of operation of the transmission and the other clutch circuit connected to the circuit by means of the other mechanism provides for operation of the clutch thereof in second and fourth gear speeds of operation of the transmission.

ANTHONY WINTHER.
MARTIN P. WINTHER.

References Cited in the file of this patent

UNITED STATES PATENTS

| Number | Name | Date |
|--------|------|------|
| 983,949 | Sundh | Feb. 14, 1911 |
| 2,244,092 | Wheeler | June 3, 1941 |
| 2,527,565 | Miller | Oct. 31, 1950 |
| 2,549,738 | Winther | Apr. 17, 1951 |